T. MOY & R. E. SHILL.
Reciprocating Steam-Engines.

No. 133,380. Patented Nov. 26, 1872.

Witnesses
William Spence
W. A. Jackson

Inventors
Thos. Moy
R. E. Shill

T. MOY & R. E. SHILL.
Reciprocating Steam-Engines.
No. 133,380. Patented Nov. 26, 1872.
4 Sheets--Sheet 4.
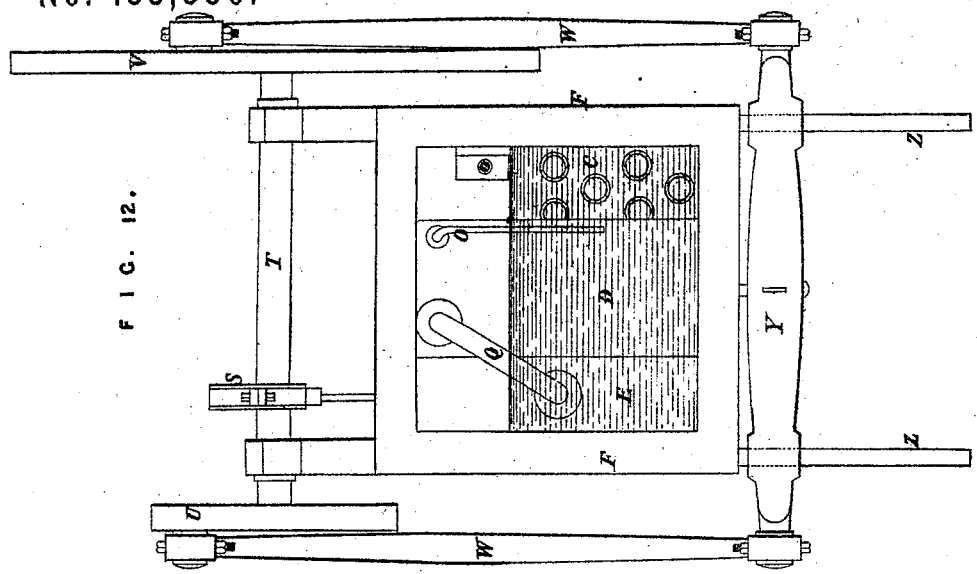
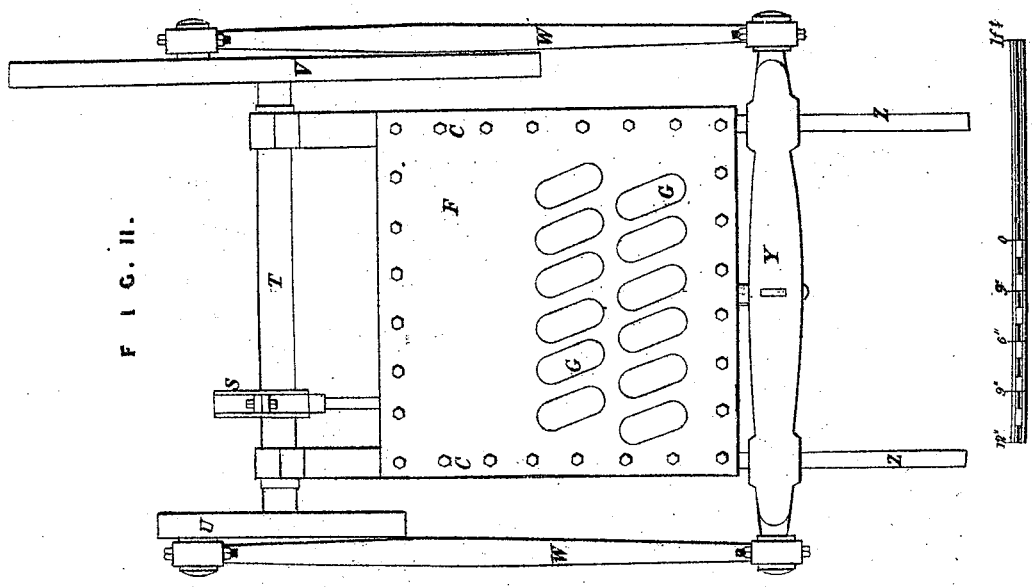
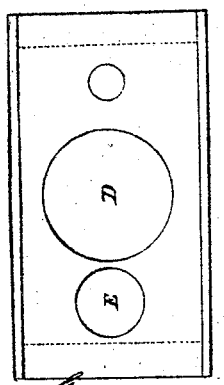
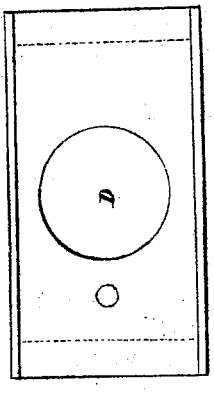
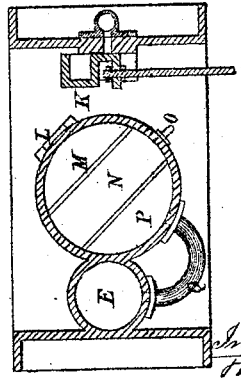
AM. PHOTO-LITHOGRAPH'C CO. N.Y.(OSBORNE'S PROCESS.)

UNITED STATES PATENT OFFICE.

THOMAS MOY, OF LONDON, AND RICHARD E. SHILL, OF MILE END, ENGLAND.

IMPROVEMENT IN RECIPROCATING STEAM-ENGINES.

Specification forming part of Letters Patent No. 133,380, dated November 26, 1872.

*To all whom it may concern:*

Be it known that we, THOMAS MOY, of 1 Clifford's Inn, in the city of London, England, engineering draftsman, and RICHARD EDMUND SHILL, of Mile End, in the county of Middlesex, England, engineer, do hereby declare the nature of our said invention for Improvements in Steam-Engines, of which the following is a specification:

Our invention of improvements in steam-engines relates to engines of smaller weight than usual, adapted for use on street tramways, for omnibuses, and for other purposes for which light engines are required; and has for its object economy and simplicity of construction, with a capability of using steam of high expansion without superheating, and consequent economy in working, also increased safety.

One or more sides of the chamber surrounding the cylinder or cylinders is or are formed by tube-plates, in which are inserted the ends of tubes bent into the form of an elongated U, into which tubes, suitably incased in brick-work or iron, water is admitted, and round which tubes the heat of a furnace, or heat produced by other means, is applied. By this arrangement the whole body of the cylinder or cylinders, except, in some cases, one or both covers thereof, is inclosed in the water and steam of the said chamber, thereby maintaining the temperature in the cylinder or cylinders and facilitating the working of the engine expansively. This arrangement also enables us to dispense with much of the ordinary framing of steam-engines.

The cylinder or cylinders is or are cast or formed with such additions thereto that the cylinders, valve-chests, and tube-plates form the body of the steam-generator, as well as of the engine.

In engines with only one cylinder we sometimes make use of two pistons, which nearly meet in the middle of the cylinder, and are worked in opposite directions simultaneously. When two pistons are used the piston rod or rods nearest to the axle is or are connected to the crank thereof by one of the well-known steeple or double-piston rod arrangements, and the piston-rod furthest from the axle is provided with a cross-head and a pair of connecting-rods leading to and actuating two cranks at suitable distances from the central crank on the axle, the outer cranks being set at opposite angles to the central crank. By this balanced arrangement of the parts the action of the engine is equalized and the smoothness of its working increased.

In engines with three cylinders we sometimes make the middle cylinder work one crank in one direction, while the two outer cylinders work two other cranks on the same axle in an opposite direction, the steam passing from the middle cylinder to the two outer cylinders through short passages at each end of the same, and expanding from the central cylinder to the outer ones.

In engines with two or more cylinders we sometimes arrange the cranks at other suitable angles, so as to equalize the rotative power obtained and cause the steam to be expanded in each cylinder independently, cutting it off at such portion of the stroke as may be necessary.

The valves are sometimes what are called piston-valves, placed in the steam-generator, or they may be ordinary slide-valves suitably arranged.

The combination of a cylinder or cylinders with its or their appendages, above referred to, also facilitates their use on the principle of compound engines, the usual superheater not being required for the outgoing steam.

In some cases we use a condenser without an air-pump, and expose the tubes to the atmosphere only, and reduce the outgoing steam to water by keeping the pressure above that of the atmosphere when necessary.

Having thus stated the nature of the said invention, we will proceed to describe more particularly in what manner the same is to be performed, by the aid of the accompanying drawing, in which are represented engines and parts thereof constructed in the manner or manners above referred to.

*Description of the Drawing.*

In Figs. 4 to 10, both inclusive, are shown detached parts, which will be hereinafter described. Fig. 11 is a side elevation of the engine without the steam-generator; and Fig. 12 is a similar view, but with one tube-plate removed.

In all these figures the same letters of reference indicate corresponding parts.

A A, Figs. 1 and 2, is the brick-work, in which are inclosed the engine surrounded by the steam-generator, with the furnace or furnaces for applying the requisite heat. B B are two furnaces or two portions of the furnace, one on each side of the engine. C is a chamber containing water and steam, and surrounding the cylinder D, both of which, together with the valve-chest E, are or may be formed in one casting. F F are tube-plates bolted to this casting, and forming the sides of the chamber C, in which plates are inserted the ends of the tubes G G, into which water is admitted, and round which the heat from the furnace or fire-places B B is applied. At the inner end of each fire-place B is fixed an iron plate or baffler, H, the smoke and gaseous products of combustion passing out through the flues I I, as shown by the arrows in Fig. 2. It will be seen, on reference to Figs. 2 and 3, that the cylinder D and valve-chest E are almost entirely surrounded by the steam and water in the steam-generator, through the side plates F F of which the water circulates through the return-tubes G G, around which is applied the heat from the furnaces or fire-places B B; and it is to be observed that this combination or incorporation of a steam-and-water chamber and return-tubes with a cylinder or cylinders and valve-chest, so that the cylinder and valve-chest may be inclosed in and surrounded by the steam-generator to the greatest practical extent, constitutes the main feature of our invention.

The mode or modes of combining these essential parts together, and with other working parts of the engine, also the mode or means of supplying the water and applying heat to the steam-generator, and other matters of detail, may be varied so long as the above-described combination or incorporation of the engine and steam-generator is maintained. The cylinder and casing or chamber being thus combined, admits of framing being almost entirely dispensed with, while the guides are arranged at one end of the cylinder, and the crank-shaft with the usual valve-gear at the other end thereof.

Figure 4:
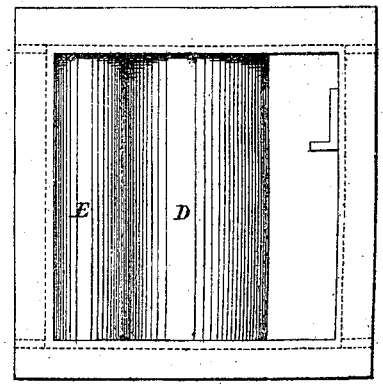

Fig. 4 shows an elevation of the casting with tube-plates and other gearing removed, and embodying the cylinder D and the valve-chest E in one piece with the steam-and-water chamber; or the cylinder may be formed by the insertion of a steel tube in the casting prepared to receive it. This casting may be in gun metal or cast-iron, or other suitable metal. It may also be forged in steel under the hammer in a block, and afterward cut away by machine tools to the required shape, and bored. In this figure one end of the cylinder is shown in one piece with the forging or casting. The space above the cylinder may be used as a steam-chest or separator.

Figure 5:
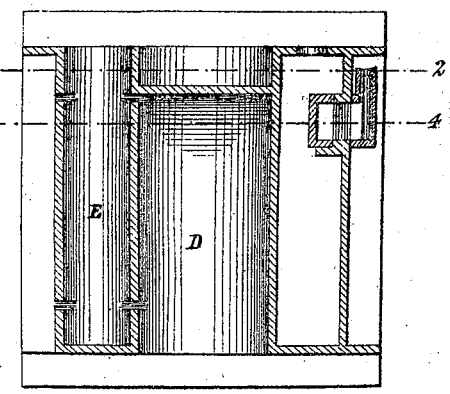

Fig. 5 is a vertical section of Fig. 4 with the water-feeding apparatus added.

Figure 6:
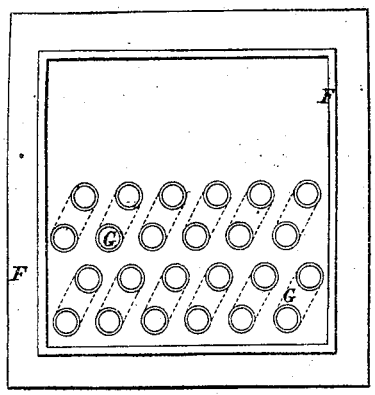

Fig. 6 is an inside view of one of the tube-plates F with tubes G G in their places. The tubes are fitted in conical holes and expanded in such holes. In some cases shoulders are wrought on the tubes to abut upon the outside of the tube-plates.

Figure 7:
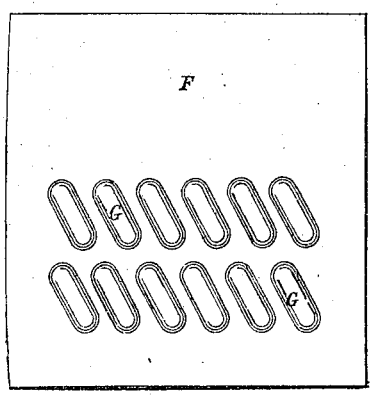

Fig. 7 is an outside view of one of the tube-plates, showing the tubes in position.

Fig. 8 is a plan view of the top of the said casting or forging, and Fig. 9 shows the bottom of the same.

Fig. 10 is a section of the casting or forging taken through the line 1 2 of Fig. 5 to show the steam-and-water separator, and through the line 3 4 of the same figure to show the feeding apparatus.

The water-supply to the boiler or steam-generator is or may be regulated either by an ordinary feed-pump, or by means of an injector, or by a slide-valve of the form and arrangement shown in Fig. 10. This slide-valve K is placed at about the height of the water level, as shown in Fig. 3.

When the water in the generator becomes low the valve fills with steam. When it is moved to the supply-port the steam escapes and water takes its place, and on the valve sliding back so as to open to the generator the water falls and steam takes its place, and so on until the water in the generator is level with the top of the slide-valve opening, when the valve moves to and fro without further filling the generator, and cannot supply any more until the level of the water in the generator has become lower than the slide-valve opening.

The steam-separator shown in Fig. 10 has in it two feathers, dividing it internally into three separate parts. The steam enters by the valve L, (when open;) passes downward in the first division or chamber M; then under the first feather out of M into N, the water being thrown down and passing back into the boiler by the small pipe O. The steam passes up the division N and over the feather into P, from whence it reaches the valve-chest E by means of the pipe Q. More feathers may be added with additional pipes to carry off the water.

Figure 1:
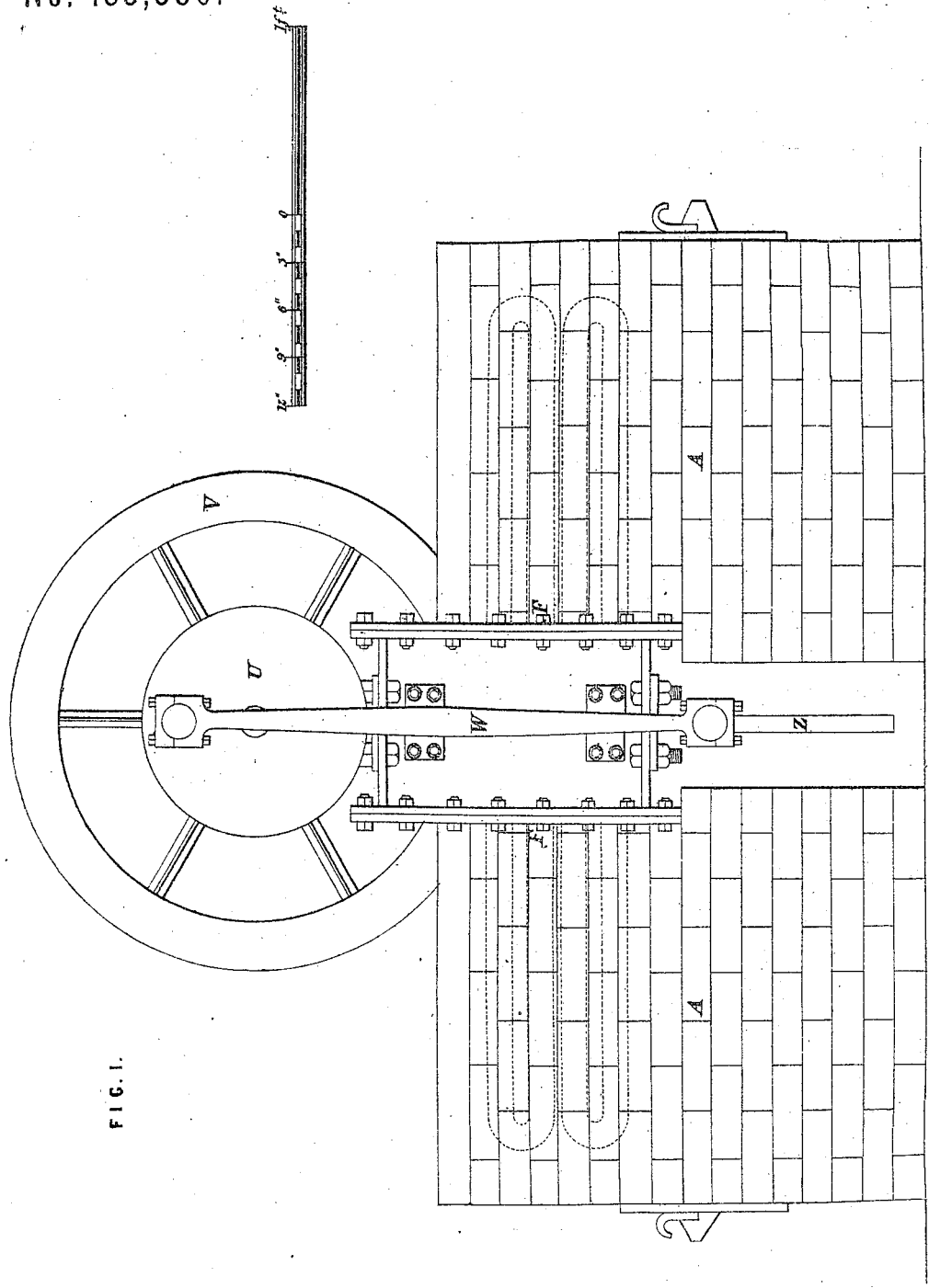
Figure 1 is an elevation of an engine, showing its combination with a steam-generator, both set in brick-work.
Figure 2:
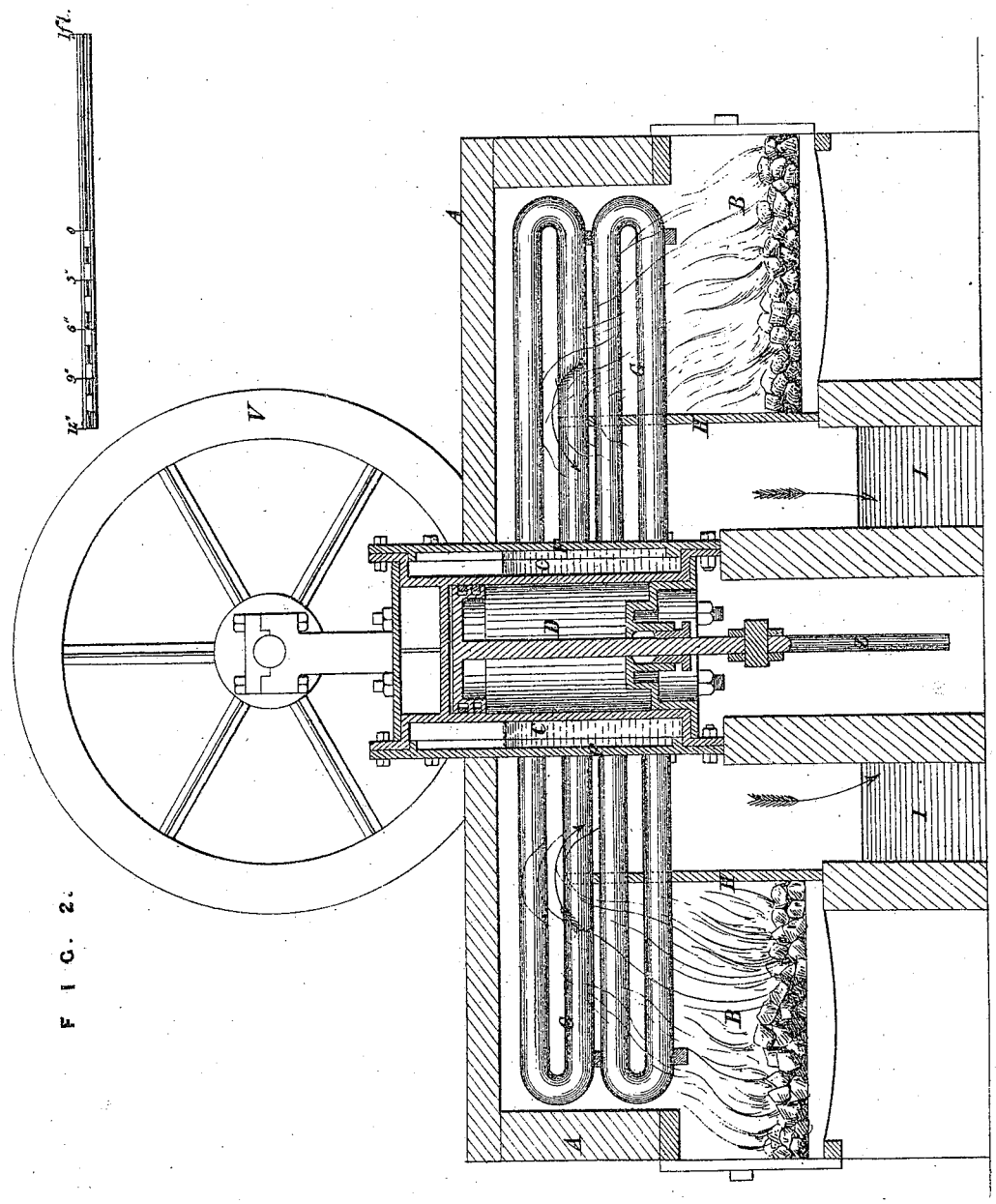
Fig. 2 is a section of the same.
Figure 3:
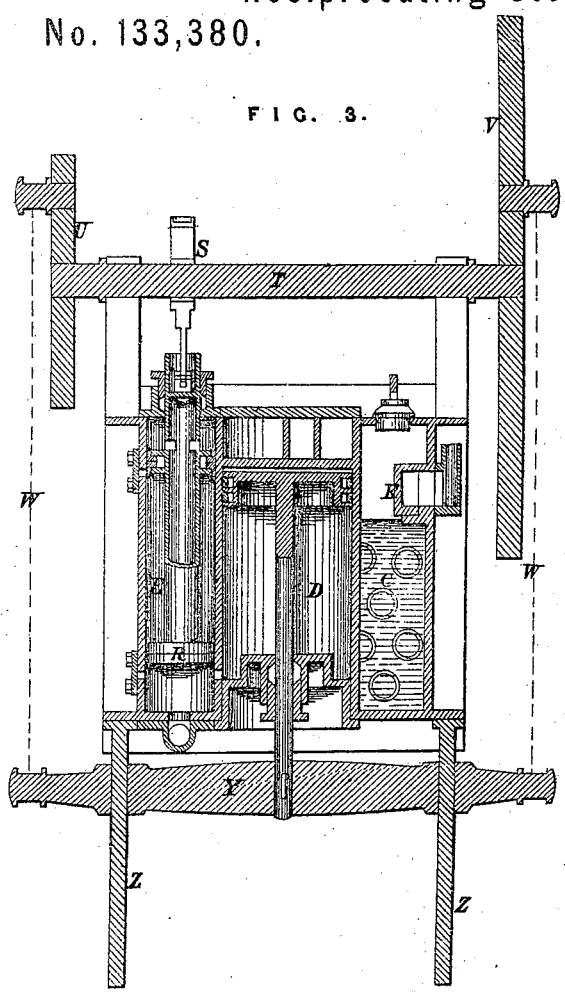
Fig. 3 is a vertical section, showing the engine only without the steam-generator, the section being taken at right angles to that on Fig. 2.

In Fig. 3 is shown, in the valve-chest E, a piston-valve, R, for admitting steam into the cylinder D, such valve being worked by the eccentric S on the crank-shaft T, the crank U and the fly-wheel V on which are respectively connected, by connecting-rods at W W, with the cross-head Y, which works on the fixed vertical guides Z Z.

Fig. 11 is an elevation of the engine with the walls of the furnace removed.

Fig. 12 is a similar elevation, but with the tube-plate F removed.

The foregoing description relates to the application of our invention to engines with a single cylinder; but it is obvious that it may be applied to compound engines, or engines with two or more cylinders.

We claim as our invention and desire to secure by Letters Patent—

1. The combination of the engine-cylinder and steam-generator, when arranged substantially as described, so that the cylinder forms a part of the structure of the generator and serves to support its connections.

2. The combination of the cylinder, water-and-steam chamber, and return-tubes communicating directly with the water-and-steam chamber, substantially as described.

3. The combination of the cylinder, tubes, furnace, and baffler to break up and circulate the flame and heat from the furnace, substantially as set forth.

4. The combination of the generator and cylinder with a steam dome or separator arranged above the cylinder, and constructed substantially as set forth.

5. The combination of the cylinder, water-and-steam chamber and separator provided with chambers, and a return-pipe for the condensed water to pass back into the water-and-steam chamber, substantially as described.

6. The slide-valve for feeding water to a steam-generator, constructed and arranged substantially as described, so that water from the reservoir fills the valve when it is below the water-level, and is conveyed by it to the generator.

THOS. MOY.
R. E. SHILL.

Witnesses:
WILLIAM SPENCE,
W. A. JACKSON.